(12) United States Patent
Chanko et al.

(10) Patent No.: US 11,268,413 B2
(45) Date of Patent: Mar. 8, 2022

(54) METHOD AND SYSTEM FOR GASOLINE PARTICULATE FILTER

(71) Applicant: Ford Global Technologies, LLC, Dearborn, MI (US)

(72) Inventors: Timothy Brian Chanko, Canton, MI (US); Andrew Gregory Getsoian, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 16/405,919

(22) Filed: May 7, 2019

(65) Prior Publication Data

US 2020/0355102 A1    Nov. 12, 2020

(51) Int. Cl.
*F01N 3/00* (2006.01)
*F01N 3/021* (2006.01)

(52) U.S. Cl.
CPC .......... *F01N 3/021* (2013.01); *B01D 2279/30* (2013.01)

(58) Field of Classification Search
CPC ............................ F01N 3/021; B01D 2279/30
USPC .......................................................... 60/274
See application file for complete search history.

(56) References Cited

U.S. PATENT DOCUMENTS

| 8,447,461 | B2 | 5/2013 | Nevin et al. |
| 8,980,187 | B2 | 3/2015 | Harris |
| 9,675,919 | B2 * | 6/2017 | Boger .................... B01D 46/42 |
| 2002/0033017 | A1 * | 3/2002 | Bruggemann ......... B01D 53/94 60/295 |
| 2008/0060351 | A1 * | 3/2008 | Pawson .................... F01N 3/00 60/299 |
| 2010/0266461 | A1 * | 10/2010 | Sappok ............. B01D 39/2093 422/177 |
| 2012/0125468 | A1 * | 5/2012 | Bouteiller .......... B01D 46/2455 138/111 |
| 2013/0243659 | A1 * | 9/2013 | Sutton ..................... B01J 35/04 422/168 |
| 2015/0364772 | A1 * | 12/2015 | Kongkanand ..... C23C 16/45553 502/313 |
| 2016/0199781 | A1 * | 7/2016 | Kim ..................... B01D 53/944 423/247 |
| 2017/0074146 | A1 * | 3/2017 | Maletic ................... F01N 3/103 |
| 2018/0017012 | A1 | 1/2018 | Suchta et al. |
| 2018/0298799 | A1 * | 10/2018 | Wessels .............. F01N 13/0097 |
| 2019/0048769 | A1 * | 2/2019 | Eriksson ................ F01N 3/021 |
| 2020/0072102 | A1 * | 3/2020 | Shao ........................ F01N 3/021 |
| 2020/0127300 | A1 * | 4/2020 | Prinz ..................... H01M 4/881 |
| 2020/0191030 | A1 * | 6/2020 | Clowes ................. F01N 3/0222 |
| 2020/0300138 | A1 * | 9/2020 | Beall ...................... B28B 3/269 |
| 2020/0330966 | A1 * | 10/2020 | Petrovic ................. C01B 39/54 |
| 2020/0362737 | A1 * | 11/2020 | Alig ........................ F01N 3/035 |

* cited by examiner

*Primary Examiner* — Jason D Shanske
(74) *Attorney, Agent, or Firm* — Geoffrey Brumbaugh; McCoy Russell LLP

(57) ABSTRACT

Methods and systems are provided for depositing one or more layers of ash on a surface of a new or cleaned gasoline particulate filter (GPF) prior to installation of the GPF in an engine and first use of the GPF. In one example, a method may include coating the GPF with the one or more layers of ash via an atomic layer deposition (ALD) technique in which two precursors react to form a layer of ash on the GPF surface.

18 Claims, 5 Drawing Sheets

METHOD AND SYSTEM FOR GASOLINE PARTICULATE FILTER

FIELD

The present description relates generally to methods and systems for a gasoline particulate filter coupled in an engine exhaust.

BACKGROUND SUMMARY

Engine combustion using gasoline fuel may generate particulate matter (PM) (such as soot and aerosols) that may be exhausted to the atmosphere. To enable emissions compliance, gasoline particulate filters (GPF) may be included in the engine exhaust, to filter out exhaust PMs before releasing the exhaust to the atmosphere. A higher efficiency GPF may be used for increased emissions quality. GPF efficiency may change with age with a newly installed GPF having a lower efficiency than a used GPF.

To increase the efficiency of the exhaust system particulate filter, a washcoat may be included with the GPF. In one example approach, shown by Harris et al. in U.S. Pat. No. 8,980,187, particulate filters may have a washcoat that includes alumina particles comprising both micro- and nano-particles. The washcoat may be applied to the particulate filter body using a washcoat slurry. By including the washcoat, a layer of alumina particles may be included along with the particulate filter to reduce the number of pores clogged with soot particles, thereby improving particulate filter efficiency.

However, the inventors herein have recognized potential issues with such approaches. As one example, inclusion of a washcoat may cause an increase in pressure drop across the GPF. The increased pressure drop may cause an increase in exhaust backpressure which may in turn reduce fuel efficiency and engine performance. By increasing the number of components in the engine system by addition of a washcoat, cost and complexity may be increased. Also, after usage over a period, the GPF efficiency may increase causing the washcoat to become redundant.

In one example, the issues described above may be addressed by a method comprising, depositing a layer of ash on a gasoline particulate filter (GPF) prior to a first use of the GPF with an engine. In this way, a single layer of ash deposited on a new or cleaned GPF may be utilized to more quickly achieve an increased filtration efficiency in operation with exhaust gas of an engine while maintaining a lower exhaust backpressure.

As one example, a new (unused) or cleaned gasoline particulate filter (GPF) (e.g., that is substantially free of an ash layer) may be coated with a single layer of ash prior to being installed into an engine system. A material deposition process such as atomic layer deposition (ALD) may be used to deposit a single layer of material constituting ash onto a substrate, the substrate being the GPF. The GPF may be inserted in a deposition chamber and the surface of the GPF to be coated may be heated to an elevated temperature. Metalorganic complex may be introduced in the chamber to coat the deposition surface with a single layer of the complex. Water vapor or oxygen may then be introduced to the chamber to oxidize the metalorganic complex and form a desired layer of metal oxide (constituting ash) on the deposition surface. By adjusting the ALD process parameters, the amount of ash deposited and the morphology of the deposited film may be regulated. The GPF with a layer of ash deposited on it may then be removed from the deposition chamber and fitted to the engine exhaust passage.

In this way, by depositing a single layer of ash prior to installation and use of the GPF, a higher GPF filtration efficiency may be attained from the very first usage. By priming the GPF with ash, drop in pressure across the GPF during first use of the GPF by a production vehicle, for example, may be reduced, thereby improving engine efficiency. By eliminating washcoats, a lower exhaust backpressure may be maintained. The technical effect of using ALD technique is that an even coating of a single ash layer may be formed on the high aspect ratio substrate such as the filter. Overall, by including a layer of ash on a new or cleaned GPF, a higher GPF efficiency may be attained at all times while maintaining desired engine efficiency and fuel economy.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
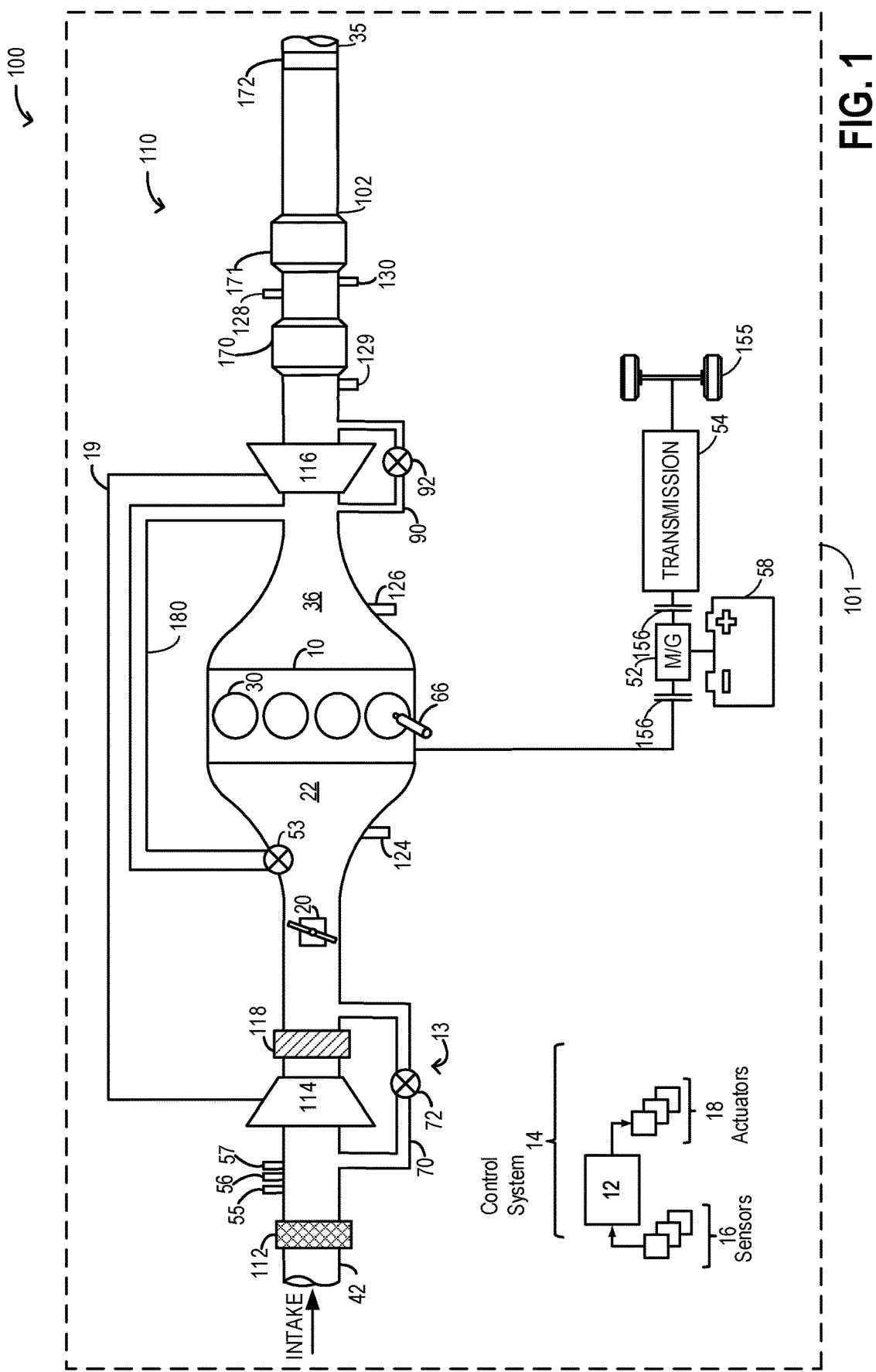
FIG. 1 shows an example engine system including a gasoline particulate filter (GPF).
Figure 2:
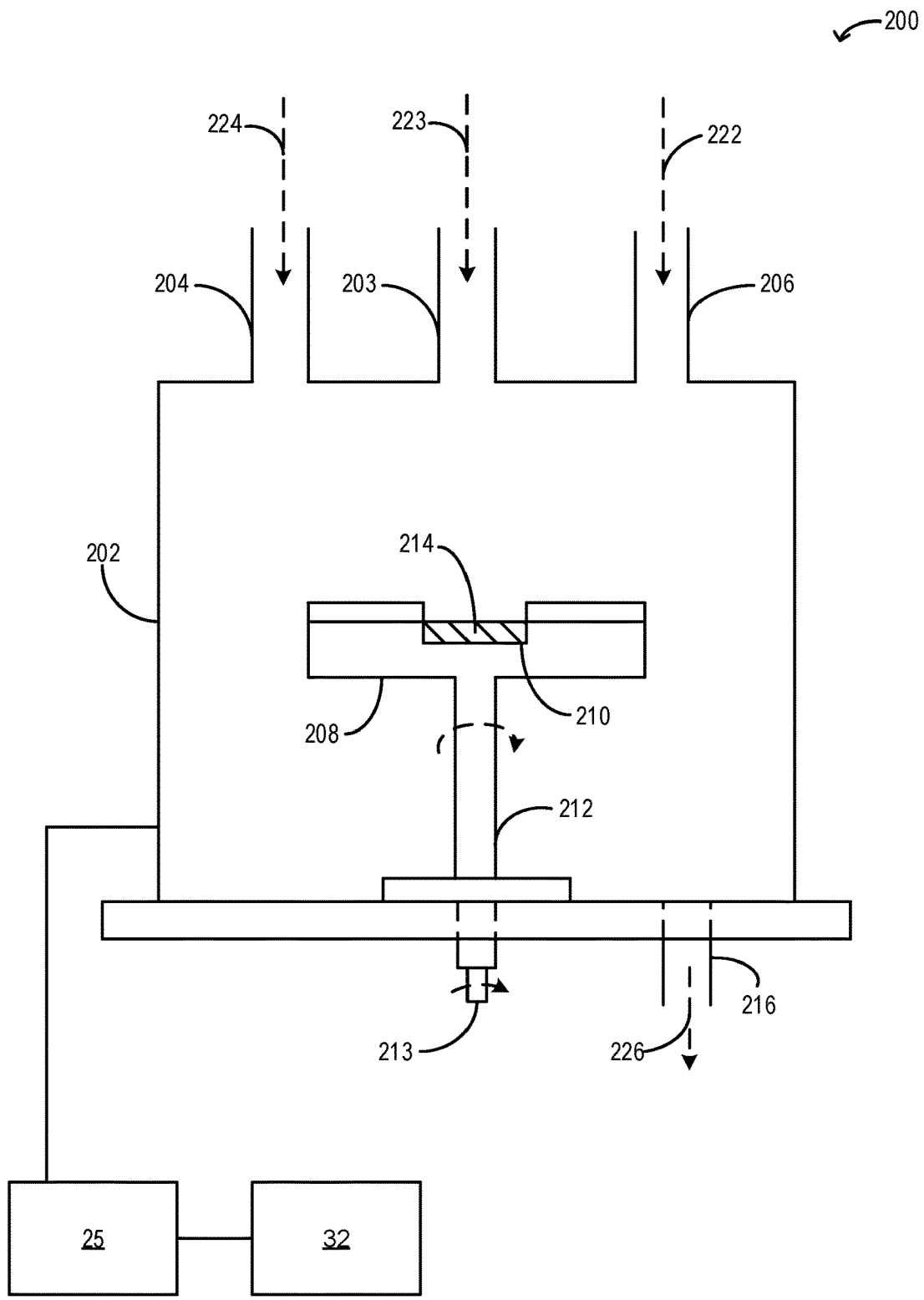
FIG. 2 shows an atomic layer deposition (ALD) apparatus.
Figure 4:
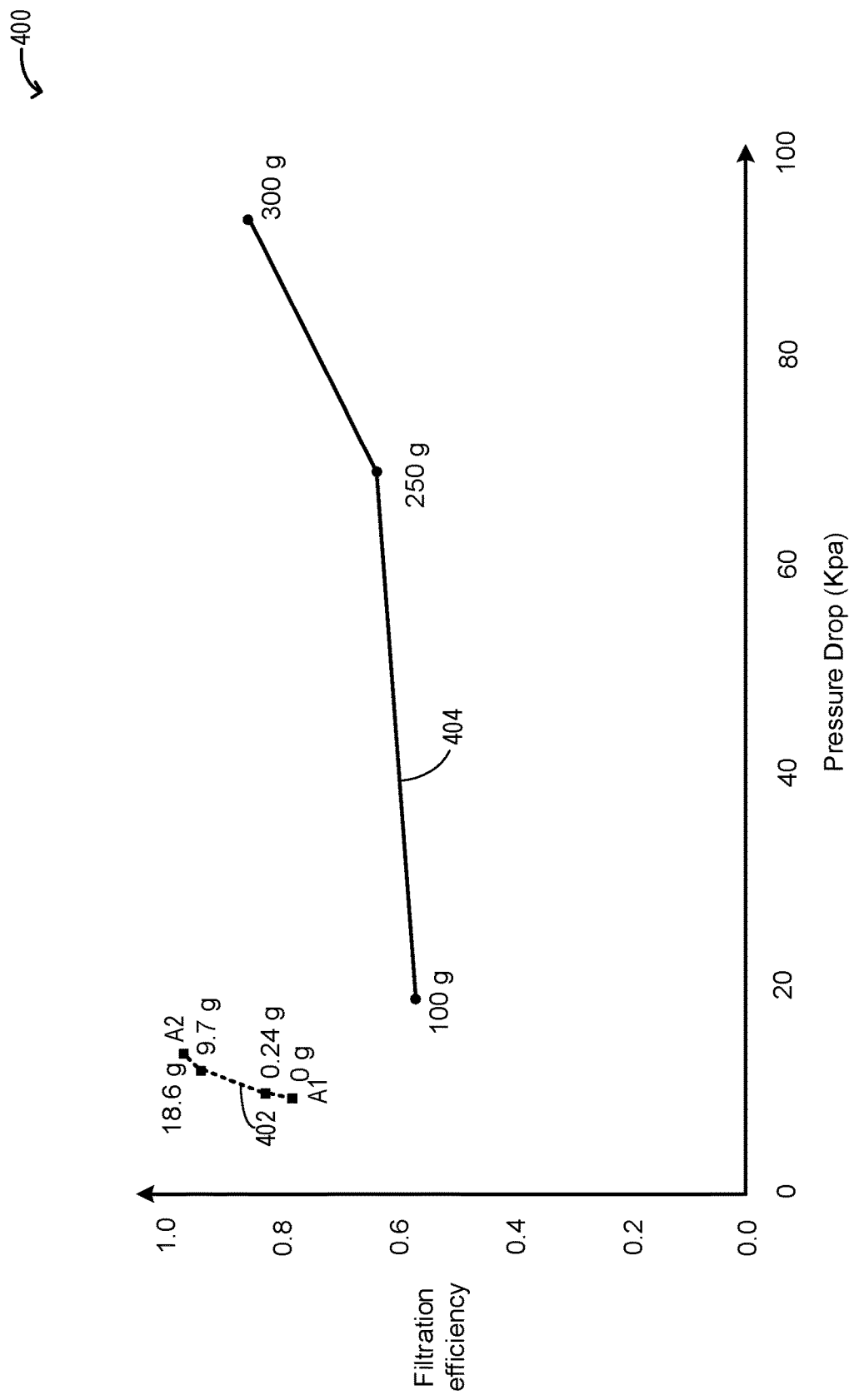
FIG. 4 shows an example plot of filtration efficiency of the GPF with pressure drop across the GPF.
Figure 5:
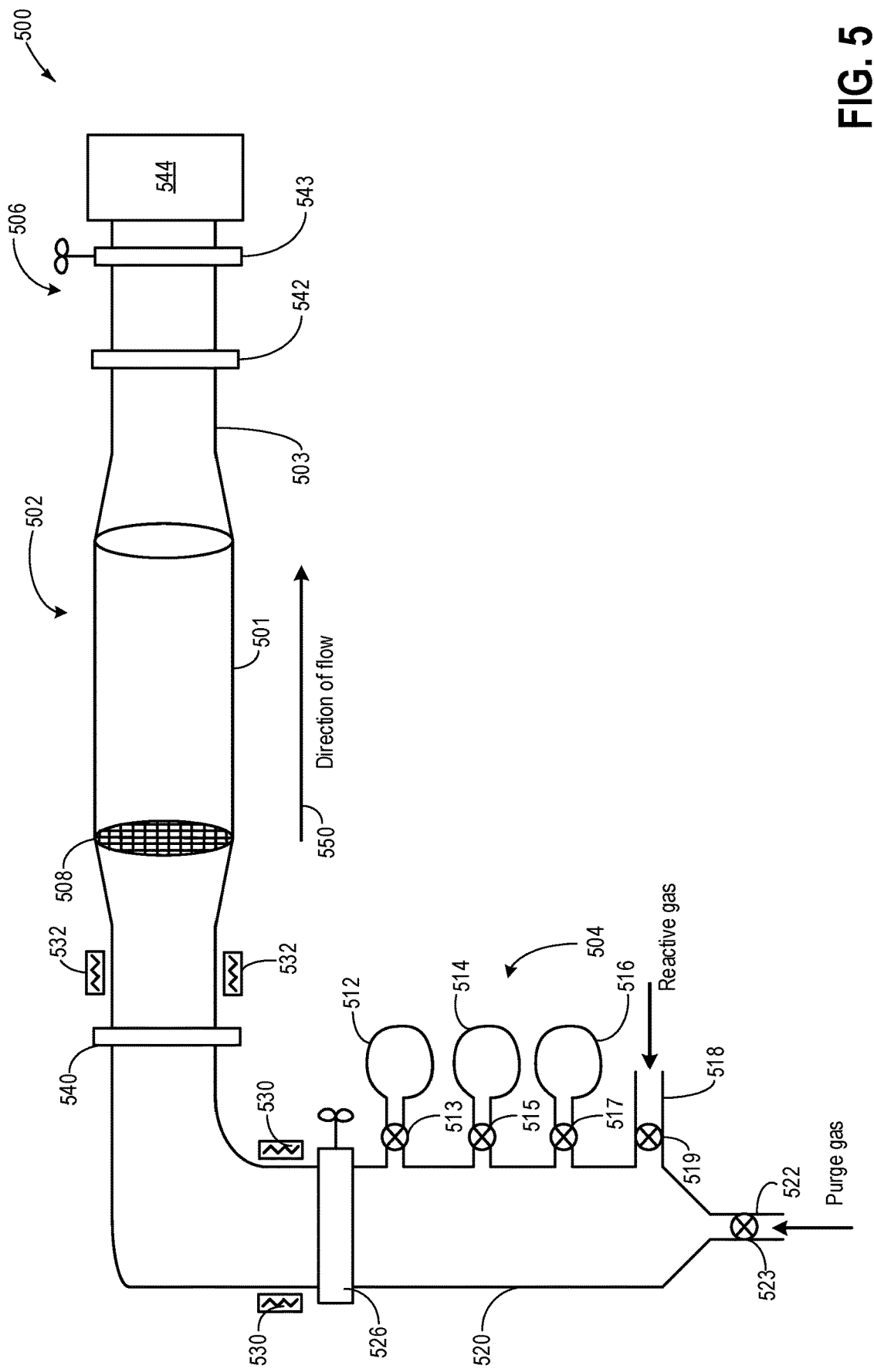
FIG. 5 shows an example set-up for ash deposition on the GPF using an ALD technique.

The following description relates to systems and methods for depositing a layer of ash onto a gasoline particulate filter (GPF) prior to installation of the GPF in a vehicle engine. A GPF filter with a layer of ash deposited on it may be used in an engine system, as shown in FIG. 1. The layer of ash may be deposited via an atomic layer deposition (ALD) technique using an ALD apparatus as shown in FIG. 2. An example setup for depositing ash on the GPF using an ALD technique is shown in FIG. 5. The method of depositing the layer of ash on the filter and assembly of the GPF to the engine system is described in FIG. 3. Deposition of the single ash layer on the filter may cause reduction in pressure drop across the GPF while improving filtration efficiency, as shown in the plot of FIG. 4.

FIG. 1 shows a schematic view 100 of a vehicle system 101 with an example engine system 110 including an engine 10. In one example, the engine system 110 may be a diesel engine system. In another example, the engine system 110 may be a gasoline engine system. In the depicted embodiment, engine 10 is a boosted engine coupled to a turbocharger 13 including a compressor 114 driven by a turbine 116. Specifically, fresh air is introduced along intake passage 42 into engine 10 via intake air filter (air cleaner) 112 and flows to compressor 114. The compressor may be any suitable intake-air compressor, such as a motor-driven or driveshaft driven supercharger compressor. In engine system 10, the compressor is a turbocharger compressor mechanically coupled to turbine 116 via a shaft 19, the turbine 116 driven by expanding engine exhaust.

As shown in FIG. 1, compressor 114 is coupled through charge-air cooler (CAC) 118 to throttle valve 20. Throttle valve 20 is coupled to engine intake manifold 22. From the compressor, the compressed air charge flows through the charge-air cooler 118 and the throttle valve 20 to the intake manifold 11. In the embodiment shown in FIG. 1, the pressure of the air charge within the intake manifold 22 is sensed by manifold air pressure (MAP) sensor 124. A compressor recirculation passage 70 coupled in parallel with the intake compressor 114 to recirculate air via the compressor 114 based on engine boost demand. A compressor recirculation valve (CRV) 72 may be coupled to the compressor recirculation passage 70 to regulate air flow via the compressor recirculation passage 70.

One or more sensors may be coupled to an inlet of compressor 114. For example, a temperature sensor 55 may be coupled to the inlet for estimating a compressor inlet temperature, and a pressure sensor 56 may be coupled to the inlet for estimating a compressor inlet pressure. As another example, a humidity sensor 57 may be coupled to the inlet for estimating a humidity of aircharge entering the compressor. Still other sensors may include, for example, air-fuel ratio sensors, etc. In other examples, one or more of the compressor inlet conditions (such as humidity, temperature, pressure, etc.) may be inferred based on engine operating conditions. In addition, when exhaust gas recirculation (EGR) is enabled, the sensors may estimate a temperature, pressure, humidity, and air-fuel ratio of the aircharge mixture including fresh air, recirculated compressed air, and exhaust residuals received at the compressor inlet.

A wastegate actuator (valve) 92 may be actuated open to dump at least some exhaust pressure from upstream of the turbine to a location downstream of the turbine via wastegate 90. By reducing exhaust pressure upstream of the turbine, turbine speed can be reduced, which in turn helps to reduce compressor surge.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure, and in some examples valve lift, may be adjusted as needed for desired combustion and emissions-control performance.

Combustion chambers 30 may be supplied with one or more fuels, such as gasoline, alcohol fuel blends, diesel, biodiesel, compressed natural gas, etc., via injector 66. Fuel may be supplied to the combustion chambers via direct injection, port injection, throttle valve-body injection, or any combination thereof. In the combustion chambers, combustion may be initiated via spark ignition and/or compression ignition.

Exhaust gas recirculation (EGR) delivery passage 180 may be coupled to the exhaust passage 102 upstream of turbine 116 to provide high pressure EGR (HP-EGR) to the engine intake manifold, downstream of compressor 114. An EGR valve 53 may be coupled to the HP-EGR passage 180 at the junction of the EGR passage 180 and the intake manifold 22. EGR valve 53 may be opened to admit a controlled amount of exhaust to the compressor outlet for desirable combustion and emissions control performance. EGR valve 53 may be configured as a continuously variable valve or as an on/off valve. In further embodiments, the engine system may include a low pressure EGR flow path wherein exhaust gas is drawn from downstream of turbine 116 and recirculated to the engine intake passage, upstream of compressor 114.

One or more sensors may be coupled to EGR passage 180 for providing details regarding the composition and condition of the HP-EGR. For example, a temperature sensor may be provided for determining a temperature of the EGR, a pressure sensor may be provided for determining a pressure of the EGR, a humidity sensor may be provided for determining a humidity or water content of the EGR, and an air-fuel ratio sensor may be provided for estimating an air-fuel ratio of the EGR. Alternatively, EGR conditions may be inferred by the one or more temperature, pressure, humidity, and air-fuel ratio sensors 55-57 coupled to the compressor inlet. In one example, air-fuel ratio sensor 57 is an oxygen sensor.

As shown in FIG. 1, exhaust from the one or more exhaust manifold sections may be directed to turbine 116 to drive the turbine. The combined flow from the turbine and the wastegate then flows through emission control device 170. In one example, the first emission control device 170 may be a light-off catalyst. In general, the exhaust after-treatment device 170 is configured to catalytically treat the exhaust flow, and thereby reduce an amount of one or more substances in the exhaust flow. For example, the exhaust after-treatment device 170 may be configured to trap $NO_x$ from the exhaust flow when the exhaust flow is lean, and to reduce the trapped $NO_x$ when the exhaust flow is rich. In other examples, the exhaust after-treatment device 170 may be configured to disproportionate $NO_x$ or to selectively reduce $NO_x$ with the aid of a reducing agent. In still other examples, the exhaust after-treatment device 170 may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together.

A particulate filter (PF) 171 is shown arranged along the exhaust passage 102 downstream of the exhaust after-treatment device 170. The particulate filter 171 may be a gasoline particulate filter or a diesel particulate filter. A substrate of the particulate filter 171 may be made of ceramic, silicon, metal, paper, or combinations thereof. During operation of the engine 10, particulate filter 171 may capture exhaust particulate matter (PMs), such as ash and soot (e.g., from unburned hydrocarbons) in order to reduce vehicle emissions. The soot may accumulate on the surfaces of the particulate filter thereby creating an exhaust backpressure. The exhaust backpressure may negatively influence the engine efficiency. In order to avoid high backpressure, when the PF soot loading reaches a threshold load, the engine 10 may opportunistically regenerate the PF during a higher than threshold exhaust temperature and a leaner than stoichiometric air fuel ratio condition.

A pressure sensor 130 may be coupled to the exhaust passage 102 upstream of the particulate filter 171 to estimate exhaust pressure. The controller may estimate the soot loading on the exhaust based on the exhaust pressure estimated via the sensor 130. A plurality of sensors, including an exhaust temperature sensor 128 and an exhaust oxygen sensor 129 may be coupled to the exhaust passage 102. The oxygen sensor may be linear oxygen sensors or UEGO (universal or wide-range exhaust gas oxygen), two-state oxygen sensors or EGO, HEGO (heated EGO), a NOx, HC, or CO sensors. From downstream of the PF 171, exhaust may be released to the atmosphere via the muffler 172 and the tailpipe 35.

The PF 171 may comprise an outer covering enclosing a monolithic (honeycomb) structure within. The monolithic structure may consist of individual cells with alternate orientations such that particulate matter (soot) present in the exhaust stream may get trapped in certain specific (first set) cells which act as inlet channels while the exhaust may pass unobstructed through a second set of cells which act as outlet channels. Soot may be generated in the engine cylinders during combustion. A current soot level at the PF 171 may be estimated based on inputs from one or more of the pressure sensor 130 and temperature sensors 128 coupled to the exhaust passage upstream and/or downstream of the GPF. For example, the soot load of the PF 171 may be determined as a function of the pressure differential and/or temperature differential across the GPF, the estimated soot load increased as the pressure differential increases. The soot level on the PF 171 may be removed to a desired level by regenerating the GPF wherein higher temperature from an electrical circuit may be used to burn the accumulated soot level. During regeneration of the PF 171, as the soot is burnt off, ash may be generated which accumulates in the PF 171.

A PF 171 filtration efficiency may be estimated based on an amount of soot generated by the engine and a capture rate of soot at the PF 171. For compliance with emissions standards, the GPF filtration efficiency is desired to be maintained above a threshold efficiency. In one example, the threshold efficiency may be 80%. However, it is observed that new GPFs when used for the first time or a cleaned GPF (e.g., that is substantially free of an ash layer), may have a lower than threshold filtration efficiency. As an example, the filtration efficiency of a new GPF may be in the range of 40%-80%. Filtration efficiency of the GPF may improve over time with usage. As an example, the GPF may have a break-in cycle of 3000 miles such that after vehicle travel of 3000 miles, the GPF may attain a higher than threshold filtration efficiency.

In order to increase filtration efficiency of a new or cleaned GPF, one or more washcoats may be added but a washcoat may cause increase in pressure drop across the GPF. An increased pressure drop may cause an increase in exhaust backpressure which may in turn reduce fuel efficiency and engine performance. In order to more quickly increase efficiency of a new (never used before) or cleaned (free of ash deposition) previously used GPF (in operation with exhaust gas of an engine) without increasing a pressure drop across the GPF, a layer of ash may be deposited on the GPF prior to installation of the GPF in the engine system.

Looking briefly to FIG. 4, FIG. 4 shows an example plot 400 depicting a relationship between filtration efficiency of and pressure drop across the gasoline particulate filter (GPF). The x-axis denotes pressure drop (in KPa) across the GPF as estimated via a pressure sensor (such as pressure sensor 130 in FIG. 1) coupled upstream and downstream of the GPF. The y-axis denotes filtration efficiency. The GPF filtration efficiency may be modeled based on an amount of soot generated by the engine and a capture rate of soot at the GPF. Dotted line 402 denotes filtration efficiency of a GPF including ash deposition of up to 18.6 g. It is observed that the filtration efficiency of the GPF increases between point A1 with no ash layer to point A2 with 18.6 g of ash coating without any significant increase in pressure drop. In contrast, by adding 100 g to 300 g washcoat, a lower increase in filtration efficiency may be attained with a higher increase in pressure drop which in turn reduced engine efficiency. In this way, GPF filtration efficiency may be improved in new vehicles by addition of one or more layers of ash without any significant adverse effect on engine efficiency.

Ash may be deposited on a surface of a GPF prior to a first use of the GPF by a production vehicle, for example, via an atomic layer deposition (ALD) technique. The surface to be coated may be without any ash or soot (prior to coating) and upon installation in the engine exhaust system, the surface of the GPF may be in contact with exhaust gas flow. A single cycle of the ALD technique includes introducing a metalorganic complex to the deposition chamber, coating a surface of the GPF with a single layer of the metalorganic complex, purging the deposition chamber, and introducing oxygen or water vapor to the deposition chamber, the deposited metalorganic complex reacting with the oxygen or water vapor to form a single layer of metal oxide on the surface. The metalorganic complex may be introduced in gaseous or liquid form, and the oxygen may be introduced in gaseous form. The ALD technique may be repeated for a first number of cycles, the first number of cycles include the number of layers of ash to be deposited on the GPF surface. After depositing the layer of ash, the GPF may be installed in an engine system in an engine assembly plant, the engine system not being operated prior to GPF installation. A detailed description of a method to deposit a layer of ash on a new or cleaned GPF will be discussed in relation to FIG. 2.

Returning to FIG. 1, engine system 110 may further include control system 14. Control system 14 is shown receiving information from a plurality of sensors 16 (various examples of which are described herein) and sending control signals to a plurality of actuators 18 (various examples of which are described herein). As one example, sensors 16 may include exhaust gas sensor 126 located upstream of the turbine 116, MAP sensor 124, exhaust temperature sensor 128, exhaust oxygen sensor 129, exhaust pressure sensor 130, compressor inlet temperature sensor 55, compressor inlet pressure sensor 56, compressor inlet humidity sensor 57, and EGR sensor. Other sensors such as additional pressure, temperature, air/fuel ratio, and composition sensors may be coupled to various locations in engine system 110. The actuators 18 may include, for example, throttle 20, EGR valve 53, wastegate valve 92, CRV 72, and fuel injector 66. The control system 14 may include a controller 12. The controller 12 may receive input data from the various sensors, process the input data, and trigger various actuators in response to the processed input data based on instruction or code programmed therein corresponding to one or more routines. For example, immediately prior to an engine-off condition, the controller may estimate PF temperature via the exhaust temperature sensor 128 and PF soot load via the pressure sensor 130, and in response to a higher than threshold PF temperature, the controller may compute a rate of change of PF temperature and a rate of change of PF soot load during the engine-off period. In another example, at the onset of a drive cycle immediately following the engine-off period, the controller may estimate the PF soot load based on the change of PF soot load during the engine-off period and then schedule PF regeneration based on the estimated soot load at the onset of a drive cycle.

In some examples, vehicle 101 may be a hybrid vehicle with multiple sources of torque available to one or more vehicle wheels 155. In other examples, vehicle 101 is a conventional vehicle with only an engine, or an electric vehicle with only electric machine(s). In the example shown, vehicle 101 includes engine 10 and an electric machine 52. Electric machine 52 may be a motor or a motor/generator. Crankshaft 40 of engine 10 and electric machine 52 are connected via a transmission 54 to vehicle wheels 155 when one or more clutches 156 are engaged. In the depicted example, a first clutch 156 is provided between crankshaft 40 and electric machine 52, and a second clutch 156 is provided between electric machine 52 and transmission 54. Controller 12 may send a signal to an actuator of each clutch 156 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 155. Electric machine 52 may also be operated as a generator to provide electrical power to charge traction battery 58, for example during a braking operation.

FIG. 2 shows a schematic of a cross-section of an atomic layer deposition (ALD) apparatus 200 that may be used to deposit a layer of ash on a surface of a gasoline particulate filter (GPF) prior to installation of the GPF in an engine exhaust system. The apparatus may include a deposition chamber 202 (also referred herein as reactor/tube reactor). The deposition chamber may be constructed with quartz. Inside the deposition chamber 202, a platform 208 (also referred herein as stage) may be poisoned on a shaft 212. The platform may include a recess 210 on its upper surface (distal from the shaft) to house a substrate 214 to be coated. In alternate embodiments, two or more recesses may be formed on the platform to allow two or more substrates to be simultaneously coated. In one example, the shaft (outside the deposition chamber 202) may be coupled to a motor which enables rotation of the shaft. By rotating the shaft, the platform 208 containing a substrate may be rotated.

A first tube 204, a second tube 203, and a third tube 206 may be coupled to the deposition chamber. In one example, each of the first tube 204, the second tube 203, and the third tube 206 may be coupled to the ceiling of the deposition chamber 202. In another example, one or more of the first tube 204, the second tube 203, and the third tube 206 may be coupled to the side walls of the deposition chamber 202. A fourth tube 216 may be coupled to the floor or a side wall of the deposition chamber. Distinct valves may control openings of each of the first tube 204, the second tube 203, the third tube 206, and the fourth tube 216.

A substrate (such as a GPF) to be coated via the ALD process may be placed with its surface to be coated facing upwards (away from the platform surface) and the chamber may be sealed. In one example, prior to initiation of deposition, the deposition chamber 202 may be evacuated via the fourth tube 216. As shown by arrow 226, air may be drawn out of the deposition chamber 202 by operating a vacuum pump. When a desired lower pressure/vacuum is attained, the valve coupled to the fourth tube 216 may be closed to seal the deposition chamber 202. In another example, the ALD deposition process may be carried out under atmospheric pressure and chamber evacuation may not be carried out. Also, the substrate may be heated to an elevated temperature such as in the range of 150° C. and 400° C.

During the ALD process, the valve coupled to the first tube 204 may be opened and a first precursor (such as a metalorganic compound) may be introduced into the deposition chamber 202 via the first tube 204, as shown by arrow 224. The first precursor may react with the surface of the substrate and form a layer on the surface. After the first precursor has dwelled in the chamber for a pre-determined duration, the valve coupled to the second tube 203 may be opened and a purge gas such as an inert gas may be introduced into the deposition chamber 202 via the second tube 203, as shown by arrow 222. The purge gas may remove all remaining first precursor particles and then the purge gas may flow out of the deposition chamber 202 via the fourth tube 216. In this way, all of the unreacted precursor particles that have not been deposited on the substrate surface may be removed. The deposition chamber 202 may be resealed, the valve coupled to the third tube 206 may be opened and a second precursor (such as oxygen/water vapor) may be introduced into the deposition chamber 202 via the second tube 206, as shown by arrow 222. The second precursor may react with the first precursor deposited on the substrate surface forming a single layer coating. As an example, the single layer coating may include a single layer of metal oxide molecules formed on the substrate surface. After the second precursor has dwelled in the chamber for a pre-determined duration, the valve coupled to the second tube 203 may be opened and the purge gas may be introduced into the deposition chamber 202 via the second tube 203, as shown by arrow 222. The purge gas may remove all remaining second precursor particles that have not reacted with the first precursor material to form the layer on the substrate surface and then the purge gas may flow out of the deposition chamber 202 via the fourth tube 216.

In one example, a coating of ZnO may be formed from dimethylzinc, diethylzinc, diphenlyzinc, or other species of the general description $ZnR_2$ where R is a saturated or unsaturated hydrocarbon as the first precursor, followed by cycling with H2O or O2 as the second precursor. In another example, a coating of CaO as Ca(thd)2 may be formed where thd=2,2,6,6,tetramethyl -3,5-heptanedionate, or CaCpi2 where Cpi=1,2,4-triisopropylcyclopentadienyl is the first precursor, alternated by cycling with water or oxygen as the second precursor. In yet another example, a layer of CaSO3/CaSO4 may be formed by using the above Ca precursors in the first half of the deposition cycle, alternating with SO2, SO3, or H2SO4 alone or together with water or oxygen in the second half of the deposition cycle (second precursor). The above mentioned precursors are examples and choice of precursors is not limited by these examples. As an example, nitrogen, argon, and helium may be used as purge gases.

During the ALD process, the platform along with the substrate may be rotated to allow uniform deposition of the precursors over the entire exposed surface area. This process may be repeated to attain a multi-layered coating. As an example, if a coating with four identical layers is desired, the ALD process (cycle) may be repeated (with same precursors and substrate temperature) four times to attain the coating with each ALD cycle depositing one layer on top of the existing layers.

The morphology and density of the coating can also be impacted by the substrate temperature and by precursor materials used. The ALD process is suited for depositing conformal films on high aspect ratio substrates such as filters, allowing the entire surface to be coated evenly. Therefore, this process, as further elaborated with relation to FIG. 3, may be carried out to coat a surface of a GPF with a layer of ash prior to installation of the GPF in the engine. In order to coat a surface of the PF, the PF may be placed with the surface facing upwards on the platform 208 inside the deposition chamber 202, the surface may be heated, and a first precursor followed by a second precursor may be introduced in the chamber 202, the first precursor reacting with the surface and the second precursor reacting with the first precursor to form a layer of ash on the surface. In this way, a surface of a PF may be coated with ash using ALD technique and then the PF may be installed in an engine exhaust system, the surface lacking any ash or soot prior to the coating.

The ALD apparatus may be coupled to a controller unit 25 and an operating console unit 32. The controller unit 25 connected to the operating console unit 32 may process the operation signals input to the operating console unit 32. The operating console unit 32 may include user input devices such as a touchscreen, keyboard, and/or a mouse. The operating console unit 32 may be used by an operator, for example, to input data such as substrate temperature, number of cycles of ALD process to be repeated, time of introduction of the first precursor, the second precursor, and the noble gas, characteristics (size, shape, and thickness) of the substrate, timing of initiation and completion of ALD process, and other process parameters. Based on the input from the operating console unit 32, the controller unit 25 may send control signals to the actuators (such as the valves coupled to each tube) to operate the actuators and carry out the deposition process.

FIG. 5 shows a schematic of an example set-up 500 that may be used to deposit a layer of ash on a surface of a gasoline particulate filter (GPF) using an atomic layer deposition (ALD) technique. The set-up includes a first portion 502, a second portion 504, and a third portion 506. The first portion 502 may be coupled to the second portion 504 via a first flange 540 and the first portion 502 may be coupled to the third portion 506 via a second flange 542. The first portion 502 may comprise an exhaust passage 503 with a GPF 501 installed inside the exhaust passage 503 prior to installation of the exhaust passage in the engine system. A cross-section 508 of the GPF exposes the surface of the GPF to be coated with ash. Heating coils 532 may be coupled to the exhaust passage 503 upstream of the GPF to heat the GPF prior to the ALD process.

The second portion 504 may be an ALD apparatus including each of a first bulb 512, a second bulb 514, and a third bulb 514 coupled to a chamber 520. The first bulb 512 may contain a first precursor, the second bulb 514 may contain a second precursor, and the third bulb 516 may contain a third precursor. During the ALD process, the first precursor may be supplied to the chamber 520 via a first valve 513, the second precursor may be supplied to the chamber 520 via a second valve 515, and the third precursor may be supplied to the chamber 520 via a third valve 517. The respective openings of the first valve 512, the second valve 514, and the third valve 516 may be adjusted based on the amount of the corresponding precursor desired and the timing of the precursor desired. In one example, one or more of the first valve 512, the second valve 514, and the third valve 516 may be simultaneously open. In another example, one of the first valve 512, the second valve 514, and the third valve 516 may be open at once. A reactive gas such as oxygen (also referred herein as a fourth precursor) may be supplied to the chamber 510 via first passage 518, and supply of the reactive gas may be regulated via actuation of a valve 519 coupled to the first passage 518. A purge gas such as nitrogen may be supplied to the chamber 510 via a second passage 523, and supply of the purge gas may be regulated via actuation of a valve 523 coupled to the second passage 522. The chamber may be a cylindrical structure with each of the first bulb 512, the second bulb 514, the third bulb 516, and the first passage 518 coupled to one side of the cylinder, and the second passage 522 coupled to one end of the cylinder 520. Another, opposite end of the cylinder 520 may be coupled to the first portion 502 via the first flange 540. Flow of gas from the chamber 520 to the first portion 502 is regulated via a valve 526 coupled to the chamber 526 upstream of each of the first bulb 512, the second bulb 514, the third bulb 516, the first passage 518, and the second passage 522. Heating coils may be coupled to the chamber 520 upstream of the valve 626 to heat the gases flowing from the chamber 520 to the GPF 501. The third portion 506 of the set-up may be a vacuum system 544 including a vacuum pump. The vacuum system 544 may be fluidically coupled to the first portion 502 via a vacuum system valve 543. The vacuum system 544 may also have an outlet to remove gases from the first portion 502. A direction of gas flow through the setup is shown by arrow 550.

During the ALD process, the vacuum system valve 543 may be opened and the vacuum system 544 may be operated to allow air to be removed from the exhaust passage 503. The vacuum system valve 542 may then be closed and the first valve 513 may be opened and a first precursor may be introduced into the chamber 220 from the first bulb 512. The first precursor may travel to the GPF via the open valve 526. The first precursor may react with the surface of the GPF and form a layer on the surface. After the first precursor has reacted with the GPF surface, supply of the first precursor may be suspended by closing the first valve 513 and then the valve 523 coupled to the second passage 222 may be opened and a purge gas may be routed to the GPF 501 via the chamber 520. The purge gas may remove all remaining first precursor particles and then the purge gas may flow out to the vacuum system 544. The second portion 502 may be resealed, the valve 519 coupled to the second passage 518 may be opened and a reactive gas be introduced into the chamber 520. The reactive gas may travel to the GPF via the open valve 526. The reactive gas may react with the first precursor deposited on the substrate surface forming a single layer coating. As an example, the single layer coating may include a single layer of metal oxide molecules formed on the GPF surface. After the desired layer has been formed on the GPF surface, supply of the reactive gas may be suspended by closing the valve 519 and then the valve 523 coupled to the second passage 222 may be opened and a purge gas may be routed to the GPF 501 via the chamber 520. The purge gas may remove all remaining reactive gas and then the reactive gas may flow out to the vacuum system. Based on the material of the desired coating on the GPF, further second precursor (from second bulb 514) and third precursor (from third bulb 516) may be used.

Figure 3:
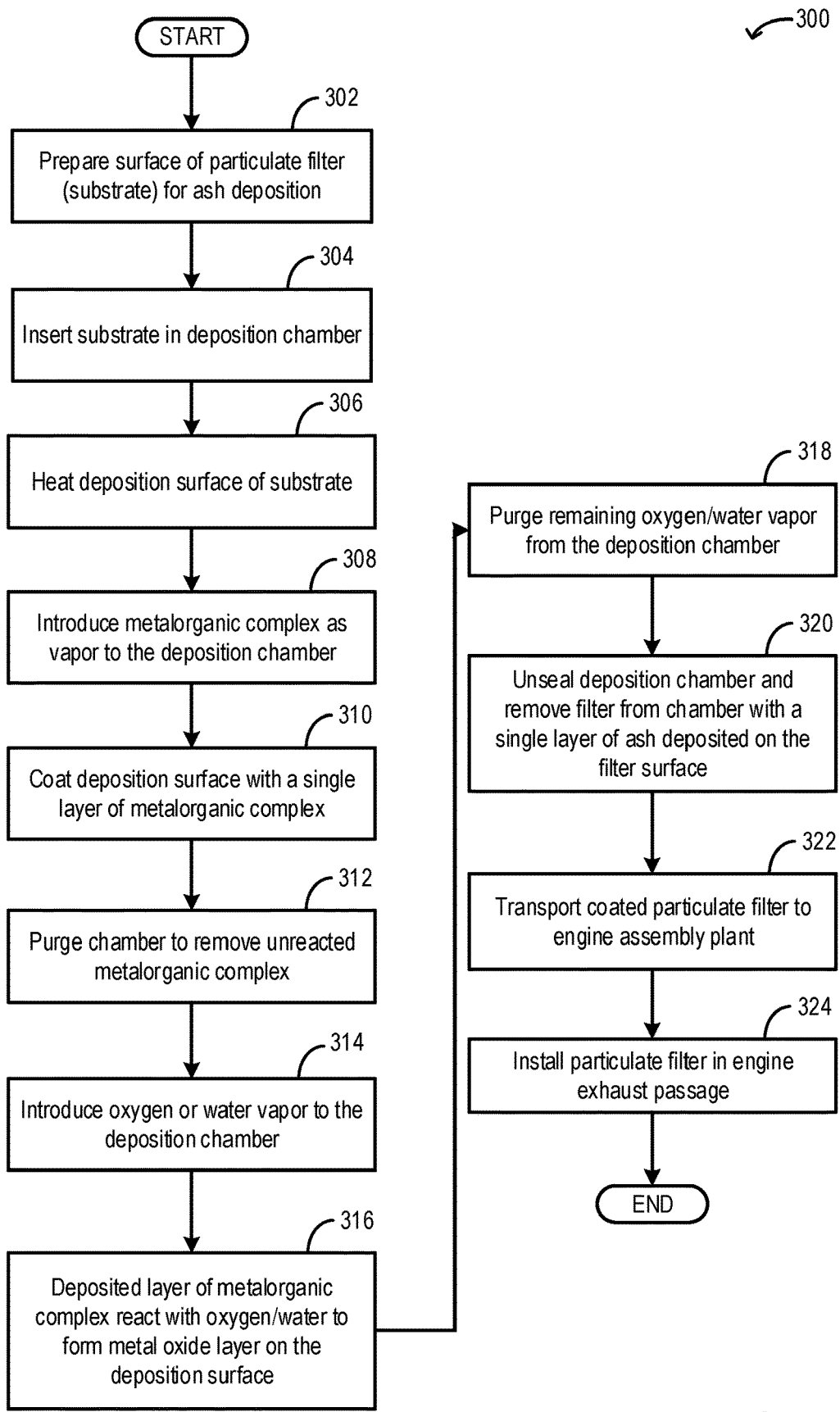
FIG. 3 shows a flow chart illustrating a method for deposition of ash on the GPF and installation of the GPF to an engine system.

Turning to FIG. 3, routine 300 depicts a method to deposit a layer on ash onto the gasoline particulate filter (GPF) and installation of the GPF in the engine exhaust system. The deposition of the ash layer may be carried out via an atomic layer deposition (ALD) technique. The GPF surface may be deposited with ash at the engine assembly plant or any other facility prior to installation of the GPF in an engine. The GPF that is being coated with ash may be a new GPF (that has not been coupled to an engine before) or a cleaned GPF (previously used) without any ash or soot deposit on the surface.

At 302, the surface (also referred herein as substrate) of the particulate filter that is to be coated with ash may be prepared for ash deposition. The GPF may have a monolithic structure including alternating open channels and plugged channels. In one example, during future engine operation, the surface of the GPF that will come in contact with exhaust gas flowing through the exhaust passage may be coated with the layer of ash. Prior to the coating process, the surface may not contain any ash or soot particles. As an example, preparation of the substrate may include cleaning the substrate by flowing a gas such as 3% oxygen (in nitrogen) at 600° C. for 10 minutes. If a previously used GPF is used for coating ash, any soot on the surface may be removed by the abovementioned method of flowing gas at an elevated temperature. In addition, prior to initiation of the ALD process, an adhesion layer may be deposited on the surface to be coated with ash. The adhesion layer may be comprised of alumina. This alumina layer may be deposited by an ALD technique prior to deposition of an ash layer (such as $CaSO_4$ layer) to improve the adhesion of the ash layer to the GPF. In another example, the adhesion layer may be made of calcium aluminate. .The adhesion layer may facilitate in anchoring subsequently deposited ash onto the GPF surface.

At 304, the substrate is inserted in a deposition chamber (such as deposition chamber 202 in FIG. 2). The deposition chamber may include a platform (also referred as stage) on which the substrate may be placed with the surface of the substrate to be coated facing upwards, away from the platform. The platform (such as platform 208 in FIG. 2) may be mechanically moved by a controller unit (such as controller unit 25 in FIG. 2.) via inputs to an operating console unit (such as operating console unit 32 in FIG. 2).

At 306, the surface of substrate to be coated may be heated to an elevated temperature. As an example, the temperature range to which the surface may be heated is between 150° C. and 400° C. In one example, a heated inert gas may be circulated through the deposition chamber (such as introduced through an opening in the ceiling or sidewalls and removed through an opening in the floor) to heat the substrate.

Once the substrate is heated, the heated inert gas may be removed from the chamber and the chamber may be vacuum sealed. In one example, a pump fluidically coupled to the chamber may be used to evacuate the chamber until desired level of vacuum (such as 1-5 Millitorr) is attained. Due to the vacuum in the chamber, the substrate may remain hot throughout the ALD process, thereby allowing deposition of the chemicals subsequently coming in contact with the pre-warmed substrate. In another example, the deposition chamber may be maintained at atmospheric pressure without evacuation.

At 308, a metalorganic complex may be introduced to the deposition chamber as vapor (in gaseous state). The metalorganic complex may be introduced from a ceiling and/or sidewalls of the chamber via a first tube (such as first tube 204 in FIG. 2) such that upon descending, the metalorganic complex may come in contact with the substrate. The metalorganic complex may also be introduced in a liquid state. In one example, the metalorganic complex may be a solution of a reactive precursor molecule in a compatible solvent such diethylzinc in hexane or calcium bis (2,2,6,6-tetramethylheptanedionate) in ethyl acetate. In another example, metalorganic complexes that are liquid under ambient conditions, such as tri(n-butyl)aluminum, may be used without added solvent. At 310, the surface of the substrate may be coated by a single layer of the metalorganic complex. The metalorganic complex reacts with the surface of the substrate but not with itself.

At 312, once the metalorganic complex has resided in the chamber for a first pre-determined duration, the chamber may be purged to remove any traces of un-deposited metalorganic complex. The first pre-determined duration may correspond to the time required for the metalorganic complex to react with the substrate and form a layer on the substrate. As an example, a purge gas may be introduced from the ceiling and/or sidewalls of the chamber via a second tube (such as second tube 203 in FIG. 2). The purge gas may be an inert gas such as Helium. The purge gas may remove any remaining molecules of the metalorganic complex and the purge gas along with the remaining metalorganic complex may exit the chamber via a fourth tube (such as fourth tube 216) at the chamber floor.

At 314, gaseous oxygen or water vapor may be introduced to the evacuation chamber. The oxygen or water vapor may be introduced from the ceiling and/or sidewalls of the chamber via a third tube (such as third tube 206 in FIG. 2) such that upon descending, the oxygen or water vapor may come in contact with the surface coated with the metalorganic complex. At 316, the deposited layer of the metalorganic complex may react with the oxygen/water vapor to form a metal oxide layer (film) on the deposition surface. In this way, a single layer of ash may be deposited on the GPF surface. The morphology and density of the film may be impacted by the deposition temperature and by the choice of metalorganic complex. In one example, an increase in deposition temperature may lead to less uniform deposition of the metalorganic precursor, resulting in increased particle size and surface roughness of the deposited ash. In another example, deposition of several layers of ash at lower temperature such as 250° C. may be followed by a thermal treatment at an elevated temperature such as 600° C. to densify the film. By depositing ash via ALD, a single uniform layer of ash may be deposited on the surface of a new or a cleaned GPF. In contrast, a surface of a used GPF may contain a one or more un-uniform layers of ash mixed with soot.

Once the gaseous oxygen or water vapor has resided in the chamber for a second pre-determined duration, at 318, the chamber may be purged to remove any traces of un-reacted oxygen or water vapor. The pre-determined duration may correspond to the time required for the oxygen or water vapor to react with the deposited layer of the metalorganic compound and form a metal oxide layer. As an example, a purge gas may be introduced from the ceiling and/or sidewalls of the chamber via the second tube. The purge gas may be an inert gas such as Helium. The purge gas may remove any remaining molecules of the oxygen/water vapor and the purge gas along with the remaining oxygen/water vapor may exit the chamber via the fourth tube at the chamber floor.

Each cycle of the ALD process described in steps 308-318 may deposit a single layer of ash on the GPF surface. As an example, if more than one layer of ash is desired to be deposited on the substrate for a thicker ash coating, the ALD cycle may be repeated based on the number of layers desired. Depositing more than one layer of ash may increase the thickness of the ash coating on the GPF surface. A user may specify the number of layers (n) of ash needed via input to an operating console unit and the control unit may repeat the ALD cycle n number of times to attain the desired n-layered coating on the substrate. The thickness of each ash, as deposited by the ALD technique, may be known based on the molecules of the ash particles, and the total thickness of the ash coating may be estimated based on the thickness of each layer and the number of layers desired. In one example, if five layers of ash is desired to be deposited, the steps between 308 and 318 may be repeated five times before proceeding to step 320 and the total thickness of the ash coating may be n times the thickness of a single layer of ash.

At 320, the deposition chamber may be unsealed and the GPF with a layer of ash deposited on the filter surface may be removed from the ALD apparatus. At 322, the coated GPF may be transported to the engine assembly plant. The coated GPF may be transported via land (such as via trucks), sea (such as via ships), and/or air (such as via airplanes) to the engine assembly plant. At 324, the coated, GPF which has not been previously installed (and used) in an engine system may be installed in an engine exhaust passage in the assembly plant. In one example, the engine may be a new engine that has never been operated prior to the installation of the GPF. The engine may then be installed in a vehicle that has not been driven prior to installation of the engine. In another example, the engine may be an older engine onto which a cleaned, previously used, GPF coated with a single ash layer may be installed.

In one example, the new or cleaned GPF (to be coated with ash) may be pre-installed in the exhaust passage and then coated with a layer of ash (following the method described in steps 308-318 of method 300) by connecting an ALD apparatus to one end of the exhaust passage and a vacuum apparatus on another, opposite end of the exhaust passage, as shown in the set-up of FIG. 5. The exhaust passage with the ash coated GPF may then be installed within a vehicle engine system.

In this way, a surface of a gasoline particulate filter (GPF) may be coated with one or more layers of ash, the coated GPF may be transported to an engine assembly plant and the GPF may be installed in an exhaust passage of an engine. The technical effect of using the ALD technique is that a uniform coating of ash of a desired thickness may be obtained without any soot. By controlling the thickness of the ash coating, pressure drop across the GPF caused by the ash coating may be regulated.

An example method comprises: depositing a layer of ash on a gasoline particulate filter (GPF) prior to a first use of the GPF with an engine. In any preceding example, additionally or optionally, the layer of ash includes a single layer of ash. In any or all of the preceding examples, additionally or optionally, the layer of ash includes multiple layers of ash. In any or all of the preceding examples, additionally or optionally, the ash is metal oxide particles. In any or all of the preceding examples, additionally or optionally, the metal oxide particles are calcium sulfate particles. In any or all of the preceding examples, the method further comprising, additionally or optionally, after depositing the layer of ash, installing the GPF in an engine in an assembly plant, wherein the engine is not operated prior to GPF installation. In any or all of the preceding examples, additionally or optionally, the ash is deposited via an atomic layer deposition (ALD) technique. In any or all of the preceding examples, the method further comprising, additionally or optionally, prior to the depositing the ash layer, placing the GPF inside a deposition chamber of an ALD instrument, sealing the deposition chamber, and evacuating the deposition chamber. In any or all of the preceding examples, the method further comprising, additionally or optionally, heating a surface of the GPF to be coated to a temperature in a range of 150° C. and 400° C., wherein the surface of the GPF is without ash and soot. In any or all of the preceding examples, additionally or optionally, during operation of the engine fitted with the GPF, the surface of the GPF is in contact with exhaust gas flow. In any or all of the preceding examples, additionally or optionally, the ALD technique includes introducing a metalorganic complex to the deposition chamber, coating a surface of the GPF with a single layer of the metalorganic complex, purging the deposition chamber, and introducing oxygen or water vapor to the deposition chamber, the deposited metalorganic complex reacting with the oxygen or water vapor to form a single layer of metal oxide on the surface. In any or all of the preceding examples, additionally or optionally, the metalorganic complex is introduced in gaseous or liquid form, and the oxygen is introduced in gaseous form. In any or all of the preceding examples, the method further comprising, additionally or optionally, purging the deposition chamber, and repeating the ALD technique to form multiple layers of metal oxide on the surface.

Another example method, comprises: coating a surface of a previously unused gasoline particulate filter (GPF) with one or more layers of ash; transporting the coated GPF to an engine assembly plant; and installing the GPF in an exhaust passage of an engine. In any preceding example, additionally or optionally, the surface of the GPF without ash is coated with ash via an atomic layer deposition (ALD) technique, the GPF inserted in a deposition chamber of an ALD apparatus. In any or all of the preceding examples, the method further comprising, additionally or optionally, repeating the ALD technique for a first number of cycles, wherein the first number of cycles include the number of layers of ash to be deposited on the surface. In any or all of the preceding examples, additionally or optionally, each cycle of the ALD technique includes introducing a metalorganic complex in a gaseous state to the deposition chamber, coating the surface of the GPF with a single layer of the metalorganic complex, purging the deposition chamber, and introducing gaseous oxygen/water vapor to the deposition chamber, the deposited metalorganic complex reacting with the gaseous oxygen/water vapor to form a single layer of metal oxide on the surface.

Yet another example method, comprises: coating a surface of a particulate filter (PF) with ash using an atomic layer deposition (ALD) technique and then installing the PF in an engine exhaust system, the surface lacking any ash or soot prior to the coating. In any preceding example, additionally or optionally, the PF is a previously unused PF or a cleaned, previously used PF, free of ash immediately prior to the coating. In any or all of the preceding examples, additionally or optionally, the coating the surface includes placing the PF with the surface facing upwards on a platform inside a deposition chamber, heating the surface, and introducing a first precursor followed by a second precursor in the deposition chamber, the first precursor reacting with the surface and the second precursor reacting with the first precursor to form a layer of ash on the surface. In any or all of the preceding examples, additionally or optionally, the first procurer is a metalorganic complex and the second precursor is oxygen/water vapor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
cleaning a previously used gasoline particulate filter (GPF) to remove all soot and ash deposited on the GPF; and
then depositing a layer of ash on the cleaned GPF, wherein the ash is deposited via an atomic layer deposition (ALD) technique.

2. The method of claim 1, wherein the layer of ash includes a single layer of ash.

3. The method of claim 1, wherein the layer of ash includes multiple layers of ash.

4. The method of claim 1, wherein the ash is metal oxide particles.

5. The method of claim 4, wherein the metal oxide particles are calcium sulfate particles.

6. The method claim 1, further comprising, prior to the depositing the layer of ash, placing the GPF inside a deposition chamber of an ALD instrument, sealing the deposition chamber, and evacuating the deposition chamber.

7. The method of claim 6, further comprising, during application of the ALD technique, heating a surface of the GPF to be coated to a temperature in a range of 150° C. and 400° C., wherein the surface of the GPF is without ash and soot.

8. The method of claim 7, wherein during operation of an engine fitted with the GPF, the surface of the GPF is in contact with exhaust gas flow.

9. The method of claim 7, wherein the ALD technique further includes introducing a metalorganic complex to the deposition chamber, coating the surface of the GPF with a single layer of the metalorganic complex, purging the deposition chamber, and introducing oxygen or water vapor to the deposition chamber, the deposited metalorganic complex reacting with the oxygen or water vapor to form a single layer of metal oxide on the surface.

10. The method of claim 7, further comprising, purging the deposition chamber, and repeating the ALD technique to form multiple layers of metal oxide on the surface.

11. The method of claim 7, wherein the cleaning of the previously used GPF to remove all soot and ash deposited on the GPF is by flowing a gas including oxygen at an elevated temperature over the surface of the GPF, the method further comprising, after flowing the gas at the elevated temperature, depositing an adhesion layer on the cleaned GPF prior to the application of the ALD technique.

12. A method, comprising:
pre-installing a cleaned, previously used gasoline particulate filter (GPF) in an exhaust passage;
connecting an atomic layer deposition (ALD) apparatus to one end of the exhaust passage and a vacuum apparatus on another, opposite end of the exhaust passage;
coating a surface of the cleaned, previously used gasoline particulate filter (GPF) with one or more layers of ash; and
installing the exhaust passage including the GPF in an engine.

13. The method of claim 12, wherein the surface of the GPF is coated with ash via an atomic layer deposition (ALD) technique, the GPF inserted in a deposition chamber of the ALD apparatus.

14. The method of claim 13, further comprising, repeating the ALD technique for a first number of cycles, wherein the first number of cycles include a number of layers of ash to be deposited on the surface.

15. The method of claim 14, wherein each cycle of the first number of cycles includes introducing a metalorganic complex in a gaseous state to the deposition chamber, coating the surface of the GPF with a single layer of the metalorganic complex, purging the deposition chamber, and introducing gaseous oxygen/water vapor to the deposition chamber, the deposited metalorganic complex reacting with the gaseous oxygen/water vapor to form a single layer of metal oxide on the surface.

16. A method, comprising:
removing soot and ash from a previously used particulate filter (PF) by flowing a gas including oxygen over a surface of the PF at an elevated temperature;
then coating the cleaned surface of the PF with ash using an atomic layer deposition (ALD) technique; and
installing the PF back in an engine exhaust system.

17. The method of claim 16, wherein the coating the surface includes placing the PF with the surface facing upwards on a platform inside a deposition chamber, heating the surface, and introducing a first precursor followed by a second precursor in the deposition chamber, the first precursor reacting with the surface and the second precursor reacting with the first precursor to form a layer of ash on the surface.

18. The method of claim 17, wherein the first precursor is a metalorganic complex and the second precursor is oxygen/water vapor.

\* \* \* \* \*